United States Patent
Trockman et al.

(10) Patent No.: US 11,922,291 B2
(45) Date of Patent: Mar. 5, 2024

(54) IMAGE PROCESSING VIA ISOTONIC CONVOLUTIONAL NEURAL NETWORKS

(71) Applicants: Robert Bosch GmbH, Stuttgart (DE); Carnegie Mellon University, Pittsburgh, PA (US)

(72) Inventors: Asher Trockman, Stuttgart (DE); Jeremy Kolter, Pittsburgh, PA (US); Devin T. Willmott, Pittsburgh, PA (US); Filipe J. Cabrita Condessa, Pittsburgh, PA (US)

(73) Assignees: Robert Bosch GmbH (DE); Carnegie Mellon University

( * ) Notice: Subject to any disclaimer, the term of this patent is extended or adjusted under 35 U.S.C. 154(b) by 345 days.

(21) Appl. No.: 17/487,631

(22) Filed: Sep. 28, 2021

(65) Prior Publication Data
US 2023/0096021 A1 Mar. 30, 2023

(51) Int. Cl.
*G06T 7/00* (2017.01)
*G06F 18/2431* (2023.01)
(Continued)

(52) U.S. Cl.
CPC ......... *G06N 3/047* (2023.01); *G06F 18/2431* (2023.01); *G06T 7/11* (2017.01);
(Continued)

(58) Field of Classification Search
CPC ........... G06K 9/00261; G06K 9/00288; G06K 9/00228; G06K 9/00268; G06K 9/00281; G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201;
(Continued)

(56) References Cited

U.S. PATENT DOCUMENTS

| | | | |
|---|---|---|---|
| 10,713,794 B1 * | 7/2020 | He | G06N 3/084 |
| 2017/0161551 A1 * | 6/2017 | Wang | G06F 18/00 |
| 2020/0211229 A1 * | 7/2020 | Hwang | G06N 3/084 |

OTHER PUBLICATIONS

A.G. Howard et al. "MobileNets: Efficient convolutional neural networks for mobile vision applications", arXiv:1704.04861v1 [cs.CV] Apr. 17, 2017, 9 pages.

* cited by examiner

*Primary Examiner* — Quan M Hua
(74) *Attorney, Agent, or Firm* — Dickinson Wright PLLC

(57) ABSTRACT

A convolutional neural network system includes a sensor and a controller, wherein the controller is configured to receive an image from the sensor, divide the image into patches, each patch of size p, extract, via a first convolutional layer, a feature map having a number of channels based on a feature detector of size p, wherein the feature detector has a stride equal to size p, refine the feature map by alternatingly applying depth-wise convolutional layers and point-wise convolutional layers to obtain a refined feature map, wherein the number of channels in the feature map and the size of the feature map remains constant throughout all operations in the refinement; and output the refined feature map.

19 Claims, 14 Drawing Sheets

(51) Int. Cl.
*G06N 3/047* (2023.01)
*G06T 7/11* (2017.01)
(52) U.S. Cl.
CPC .............. *G06T 2207/10044* (2013.01); *G06T 2207/10132* (2013.01); *G06T 2207/20021* (2013.01); *G06T 2207/20084* (2013.01)
(58) Field of Classification Search
CPC . G06T 2207/30241; G06T 2207/30244; G06T 7/251; G06T 7/74; G06T 7/80
See application file for complete search history.

900

3D Layout $Y_{conv} \in \mathbb{R}^{h \times \frac{n}{p} \times \frac{n}{p}}$

IMAGE PROCESSING VIA ISOTONIC CONVOLUTIONAL NEURAL NETWORKS

TECHNICAL FIELD

This disclosure relates generally to image processing using an isotonic convolutional neural network. More specifically, this application relates to improvements allowing for reduced parameters in an isotonic convolutional neural network.

BACKGROUND

Object recognition is a fundamental problem in computer vision that involves classifying an image into a pre-defined number of classes. Convolutional Neural Networks (CNNs) have achieved state-of-the-art results on this problem, thanks to the availability of large and labeled datasets and of powerful computation infrastructure. CNNs automatically extract discriminative classification features from the training images and use them in combination to recognize complex objects. This enables CNNs to significantly outperform traditional computer vision approaches on large-scale datasets such as ImageNet, as the latter usually rely on heuristic features.

SUMMARY

A first illustrative embodiment discloses a computer-implemented method for processing an image utilizing a convolutional neural network. The method includes receiving an image, dividing the image into patches, each patch of size p, extracting, via a first convolutional layer, a feature map having a number of channels based on a feature detector of size p, wherein the feature detector has a stride equal to size p, refining the feature map by alternatingly applying depth-wise convolutional layers and point-wise convolutional layers to obtain a refined feature map, wherein the number of channels in the feature map, and the size of the feature map remains constant throughout all operations in the refinement, and outputting the refined feature map.

A second illustrative embodiment discloses, a computer-implemented method for processing an image utilizing a convolutional neural network. The computer-implemented method includes receiving an image of size L×W, dividing the image into patches, wherein a combined size of each patch equals L×W, extracting, via a first convolutional layer, a feature map having a number of channels based on a feature detector of size equal to the patch size, wherein the feature detector has a stride equal to the patch size, refining the feature map by alternatingly applying depth-wise convolutional layers and point-wise convolutional layers to obtain a refined feature map, wherein the number of channels in the feature map and the size of the feature map remains constant throughout all operations in the refinement, and outputting the refined feature map.

A third illustrative embodiment discloses, a convolutional neural network system includes a sensor and a controller, wherein the controller is configured to receive an image from the sensor, divide the image into patches, each patch of size p, extract, via a first convolutional layer, a feature map having a number of channels based on a feature detector of size p, wherein the feature detector has a stride equal to size p, refine the feature map by alternatingly applying depth-wise convolutional layers and point-wise convolutional layers to obtain a refined feature map, wherein the number of channels in the feature map and the size of the feature map remains constant throughout all operations in the refinement; and output the refined feature map.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque), a chemical sensor (e.g., ion-sensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

Figure 1:
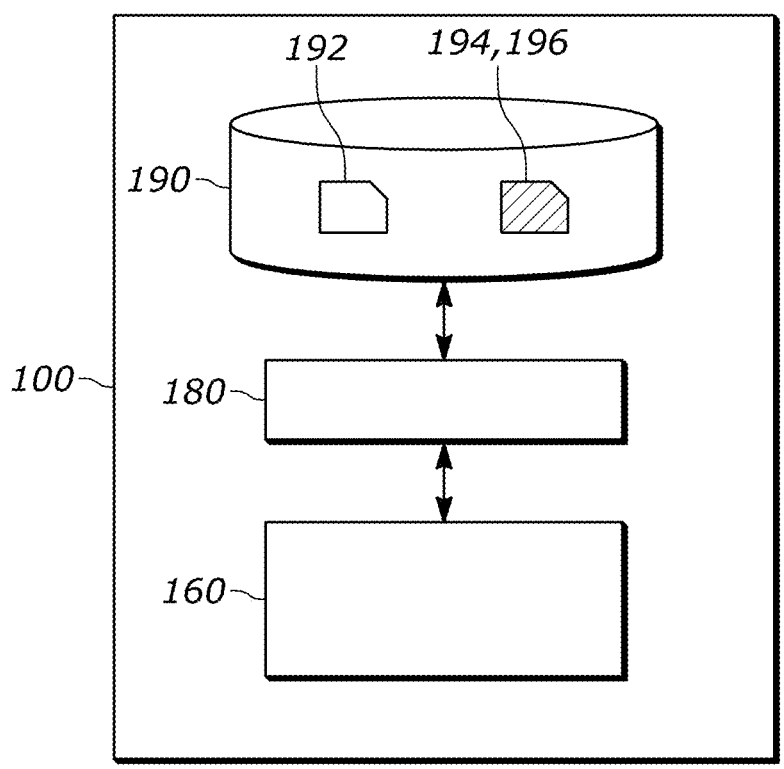
FIG. 1 is a block diagram of a system for training a neural network.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. In one embodiment, respective layers of the stack of layers being substituted may have mutually shared weights and may receive, as input, an output of a previous layer, or for a first layer of the stack of layers, an initial activation, and a part of the input of the stack of layers. The system may also include multiple layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyper parameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
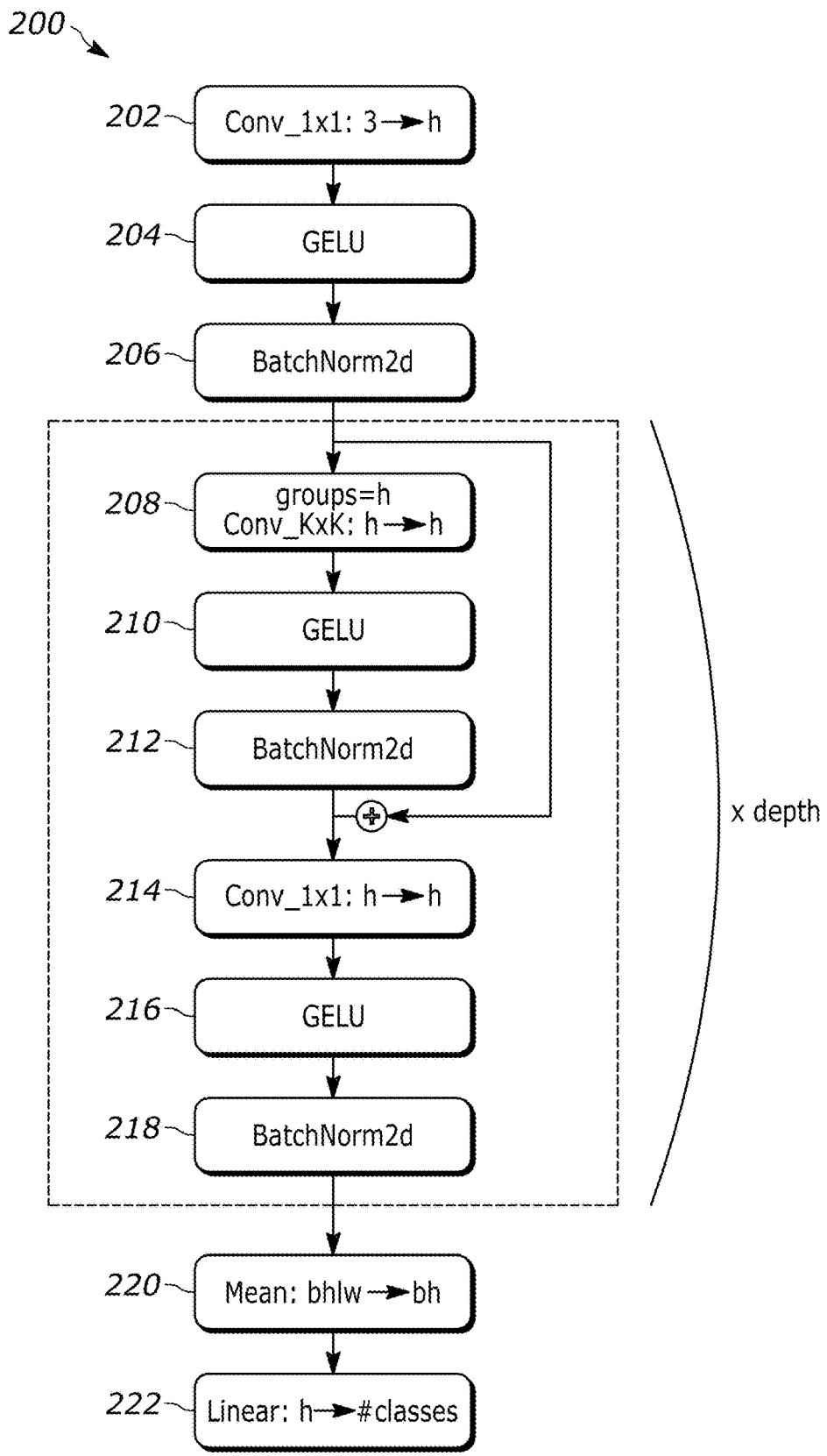
FIG. 2 is a flow diagram of an isotropic convolutional neural network wherein the number of channels in the feature map and the size of the feature map remains constant throughout all operations.

FIG. 2 is a flow diagram of an isotropic convolutional neural network 200 wherein the number of channels in the feature map and the size of the feature map remains constant throughout all operations. In step 202, a controller performs a convolution. The convolution may be a pixel-wise convolution (e.g., 1×1) or a patch wise convolution (e.g., p×p). If the convolution is patch wise like p×p, the stride would be p such that there is no overlap. In step 204, the controller performs an activation function which includes a non-linear function applied to each element of the feature map. The activation function is shown to be a Gaussian Error Linear Unit (GELU), however the activation function may be a Rectified Linear Unit (ReLU), Exponential Linear Unit (ELU), Leaky Rectified Linear Unit (Leaky ReLU), Scaled Exponential Linear Unit (SELU), or other activation function. In step 206 the controller performs a batch normalization function which is an averaging of values across the whole batch. Steps 202, 204, and 206 make up a convolution layer.

In Step 208 is a depth-wise convolution. In step 210, the controller performs an activation function as described in step 204. In step 212 the controller performs a batch normalization function which is an averaging of values across the whole batch. Steps 208, 210, and 212 make up a depth-wise convolution layer. The controller may optionally add the input feature map of the depth-wise convolutional layer to the output.

In Step 214 is a point-wise convolution, the convolution may be a pixel-wise convolution (e.g., 1×1). In step 216, the controller performs an activation function as described in step 204. In step 218 the controller performs a batch normalization function which is an averaging of values across the whole batch. Steps 214, 216, and 218 make up a point-wise convolution layer. The controller may optionally add the input feature map of the pixel-wise convolutional layer to the output.

In step 220, the controller averages over all pixels in the feature maps. In step 222 the controller performs a linear transformation to predict classes.

One of the advantages of the combination of alternating convolutions depth-wise and point-wise includes a reduction in parameters with respect to a traditional CNNs. The architecture presented here includes three stages: (1) a patch embedding to project inputs onto a higher dimensional space for processing, (2) repeated applications of a fully-convolutional block, and (3) global pooling followed by a linear classifier (e.g., softmax). The first step (1) may include a p×p-kernel convolution from 3→h channels with stride p, where p is the patch size. Then in step (2) includes a k×k-kernel depth-wise-separable convolution from h→h channels (with padding so input and output dimensions are the same) followed by a 1×1-kernel convolution from h→h channels. Each convolution is followed by an activation function as described above (e.g., GELU) and post-activation batch normalization function (e.g., BatchNorm).

After is mixing. The depth-wise-separable convolution has produced improved results with a relatively large kernel size k, such as 9. This layer mixes spatial information, including from distant locations due to the large kernel size. Next, the 1×1 convolution mixes channel information. These are analogous to the token mixing and channel mixing steps of MLP-Mixer.

Isotropy. After the patch embedding step, the internal resolution of the network is always h/p×w/p. Performing convolutions with large kernel sizes on high-resolution internal representations can be expensive. However, in the Fourier domain, the running time of this operation is independent of the kernel size, this could be leveraged in select deep learning frameworks in which the framework automatically switches to FFT processing.

Figure 3:
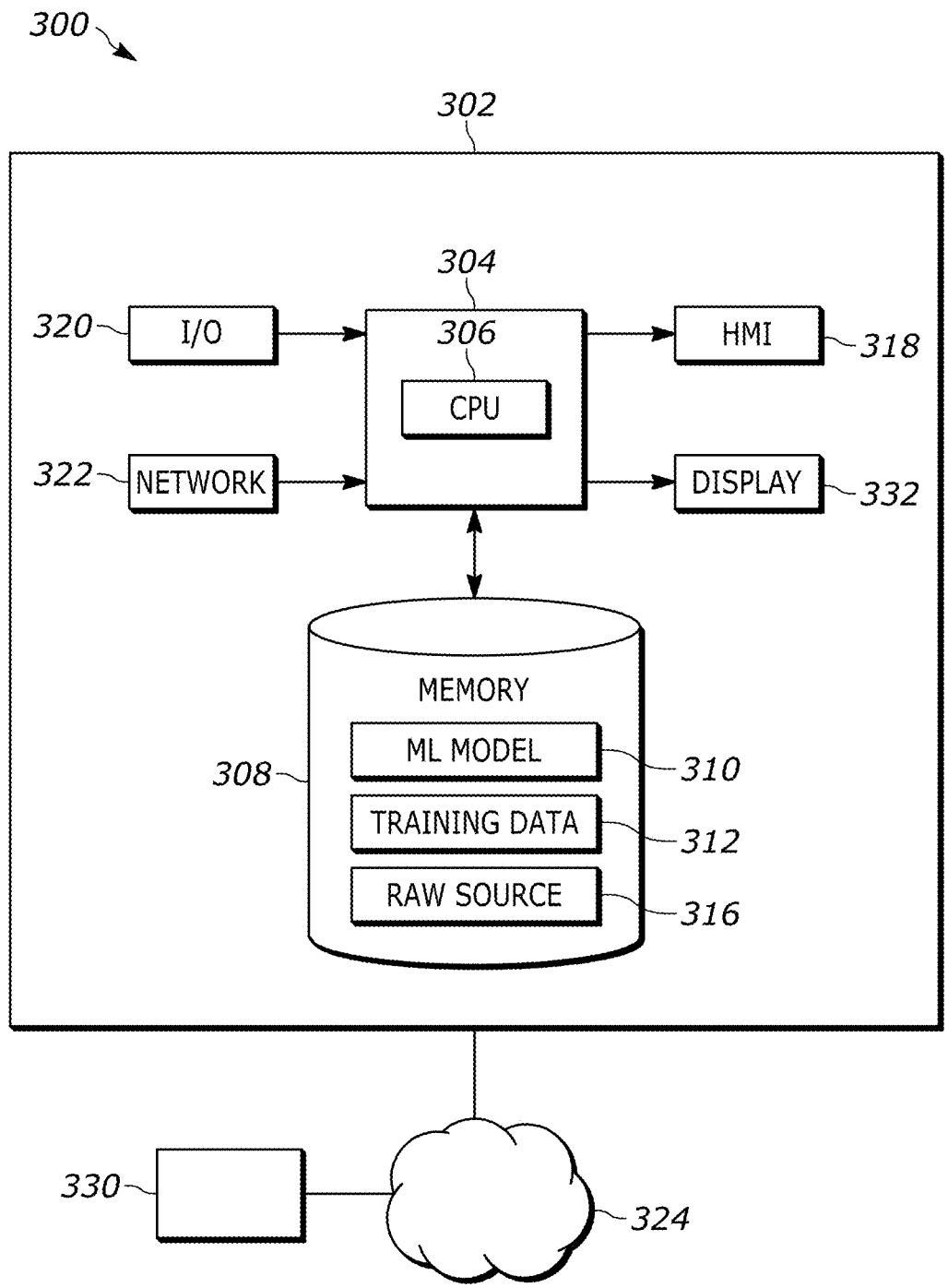
FIG. 3 is a block diagram of a data annotation system utilizing a machine learning model.

FIG. 3 depicts a data annotation system 300 to implement a system for annotating data. The data annotation system 300 may include at least one computing system 302. The computing system 302 may include at least one processor 304 that is operatively connected to a memory unit 308. The processor 304 may include one or more integrated circuits that implement the functionality of a central processing unit (CPU) 306. The CPU 306 may be a commercially available processing unit that implements an instruction stet such as one of the x86, ARM, Power, or MIPS instruction set families. During operation, the CPU 306 may execute stored program instructions that are retrieved from the memory unit 308. The stored program instructions may include software that controls operation of the CPU 306 to perform the operation described herein. In some examples, the processor 304 may be a system on a chip (SoC) that integrates functionality of the CPU 306, the memory unit 308, a network interface, and input/output interfaces into a single integrated device. The computing system 302 may implement an operating system for managing various aspects of the operation.

The memory unit 308 may include volatile memory and non-volatile memory for storing instructions and data. The non-volatile memory may include solid-state memories, such as NAND flash memory, magnetic and optical storage media, or any other suitable data storage device that retains data when the computing system 302 is deactivated or loses electrical power. The volatile memory may include static and dynamic random-access memory (RAM) that stores program instructions and data. For example, the memory unit 308 may store a machine-learning model 310 or algorithm, a training dataset 312 for the machine-learning model 310, raw source dataset 315. The model 310 may include a convolutional neural network as described in this disclosure and illustrated in FIG. 2. Also, the training dataset 312 may include features and the feature extractor as described in this disclosure and illustrated in FIGS. 2, 4, 6, 7, 8, 9, and 10. And the raw source 315 may include data from multiple input modalities as described in this disclosure and illustrated in FIGS. 6, 11, 12, 13, 14, 15, and 16.

The computing system 302 may include a network interface device 322 that is configured to provide communication with external systems and devices. For example, the network interface device 322 may include a wired and/or wireless Ethernet interface as defined by Institute of Electrical and Electronics Engineers (IEEE) 802.11 family of standards. The network interface device 322 may include a cellular communication interface for communicating with a cellular network (e.g., 3G, 4G, 5G). The network interface device 322 may be further configured to provide a communication interface to an external network 324 or cloud.

The external network 324 may be referred to as the world-wide web or the Internet. The external network 324 may establish a standard communication protocol between computing devices. The external network 324 may allow information and data to be easily exchanged between computing devices and networks. One or more servers 330 may be in communication with the external network 324.

The computing system 302 may include an input/output (I/O) interface 320 that may be configured to provide digital and/or analog inputs and outputs. The I/O interface 320 may include additional serial interfaces for communicating with external devices (e.g., Universal Serial Bus (USB) interface).

The computing system 302 may include a human-machine interface (HMI) device 318 that may include any device that enables the system 300 to receive control input. Examples of input devices may include human interface inputs such as keyboards, mice, touchscreens, voice input devices, and other similar devices. The computing system 302 may include a display device 332. The computing system 302 may include hardware and software for outputting graphics and text information to the display device 332. The display device 332 may include an electronic display screen, projector, printer or other suitable device for displaying information to a user or operator. The computing system 302 may be further configured to allow interaction with remote HMI and remote display devices via the network interface device 322.

The system 300 may be implemented using one or multiple computing systems. While the example depicts a single computing system 302 that implements all of the described features, it is intended that various features and functions may be separated and implemented by multiple computing units in communication with one another. The particular system architecture selected may depend on a variety of factors.

The system 300 may implement a machine-learning algorithm 310 that is configured to analyze the raw source dataset 315. The raw source dataset 315 may include raw or unprocessed sensor data that may be representative of an input dataset for a machine-learning system. The raw source dataset 315 may include video, video segments, images, text-based information, and raw or partially processed sensor data (e.g., radar map of objects). In some examples, the machine-learning algorithm 310 may be a neural network algorithm that is designed to perform a predetermined function. For example, the neural network algorithm may be configured in automotive applications to identify pedestrians in video images.

The computer system 300 may store a training dataset 312 for the machine-learning algorithm 310. The training dataset 312 may represent a set of previously constructed data for training the machine-learning algorithm 310. The training dataset 312 may be used by the machine-learning algorithm 310 to learn weighting factors associated with a neural network algorithm. The training dataset 312 may include a set of source data that has corresponding outcomes or results that the machine-learning algorithm 310 tries to duplicate via the learning process. In this example, the training dataset 312 may include source videos with and without pedestrians and corresponding presence and location information. The source videos may include various scenarios in which pedestrians are identified.

The machine-learning algorithm 310 may be operated in a learning mode using the training dataset 312 as input. The machine-learning algorithm 310 may be executed over a number of iterations using the data from the training dataset 312. With each iteration, the machine-learning algorithm 310 may update internal weighting factors based on the achieved results. For example, the machine-learning algorithm 310 can compare output results (e.g., annotations) with those included in the training dataset 312. Since the training dataset 312 includes the expected results, the machine-learning algorithm 310 can determine when performance is acceptable. After the machine-learning algorithm 310 achieves a predetermined performance level (e.g., 100% agreement with the outcomes associated with the training dataset 312), the machine-learning algorithm 310 may be executed using data that is not in the training dataset 312. The trained machine-learning algorithm 310 may be applied to new datasets to generate annotated data.

The machine-learning algorithm 310 may be configured to identify a particular feature in the raw source data 315. The raw source data 315 may include a plurality of instances or input dataset for which annotation results are desired. For example, the machine-learning algorithm 310 may be configured to identify the presence of a pedestrian in video images and annotate the occurrences. The machine-learning algorithm 310 may be programmed to process the raw source data 315 to identify the presence of the particular features. The machine-learning algorithm 310 may be configured to identify a feature in the raw source data 315 as a predetermined feature (e.g., pedestrian). The raw source data 315 may be derived from a variety of sources. For example, the raw source data 315 may be actual input data collected by a machine-learning system. The raw source data 315 may be machine generated for testing the system. As an example, the raw source data 315 may include raw video images from a camera.

In the example, the machine-learning algorithm 310 may process raw source data 315 and output an indication of a representation of an image. The output may also include augmented representation of the image. A machine-learning algorithm 310 may generate a confidence level or factor for each output generated. For example, a confidence value that exceeds a predetermined high-confidence threshold may indicate that the machine-learning algorithm 310 is confident that the identified feature corresponds to the particular feature. A confidence value that is less than a low-confidence threshold may indicate that the machine-learning algorithm 310 has some uncertainty that the particular feature is present.

Figure 4:
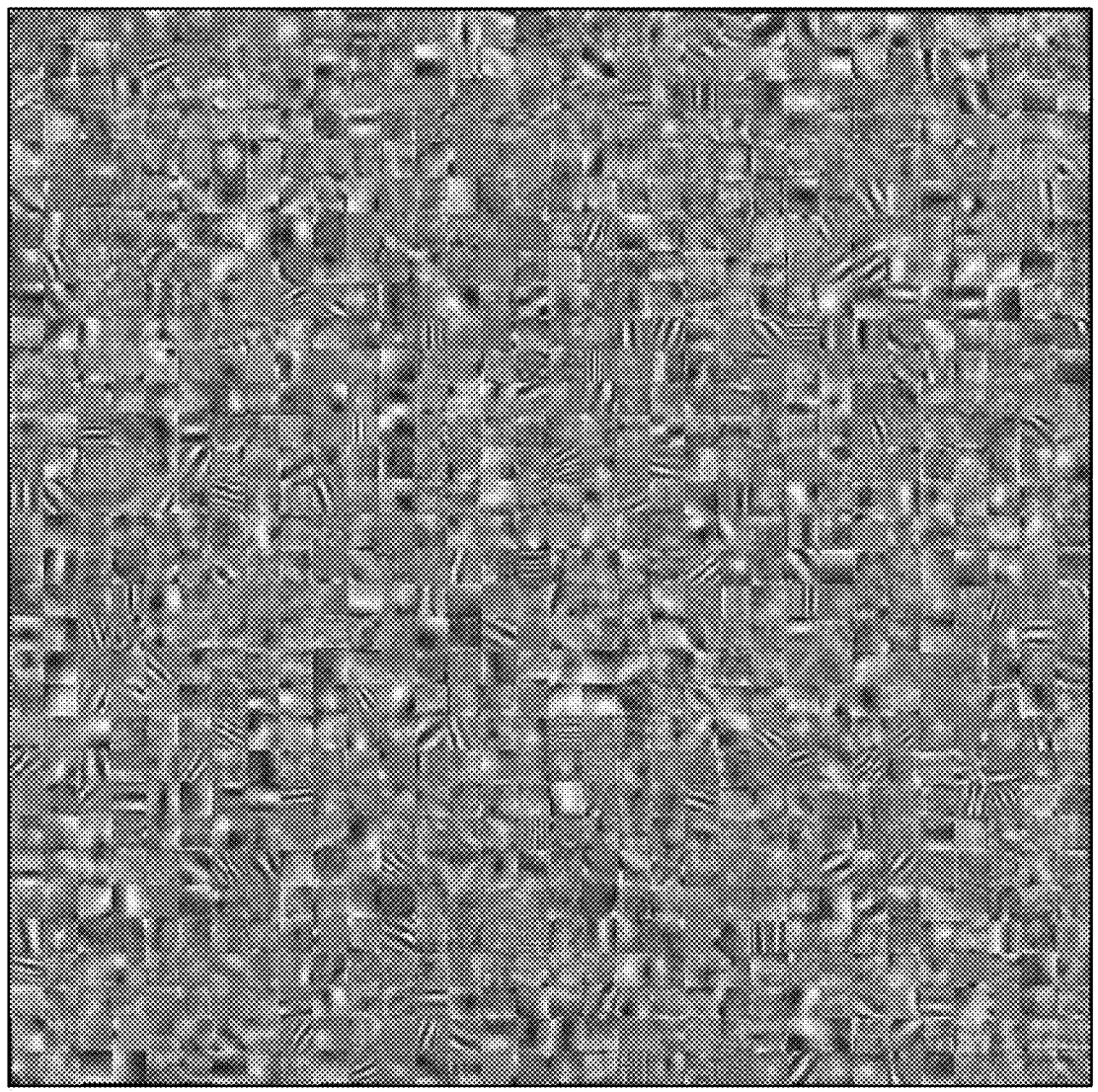
FIG. 4 is a graphical representation of patch embedding weights for a ConvMixer-1024/20 with patch size 14.

FIG. 4 is a graphical representation of patch embedding weight visualizations 400 for a ConvMixer-1024/20 with patch size 14 as described in Table 1.

Figure 5:
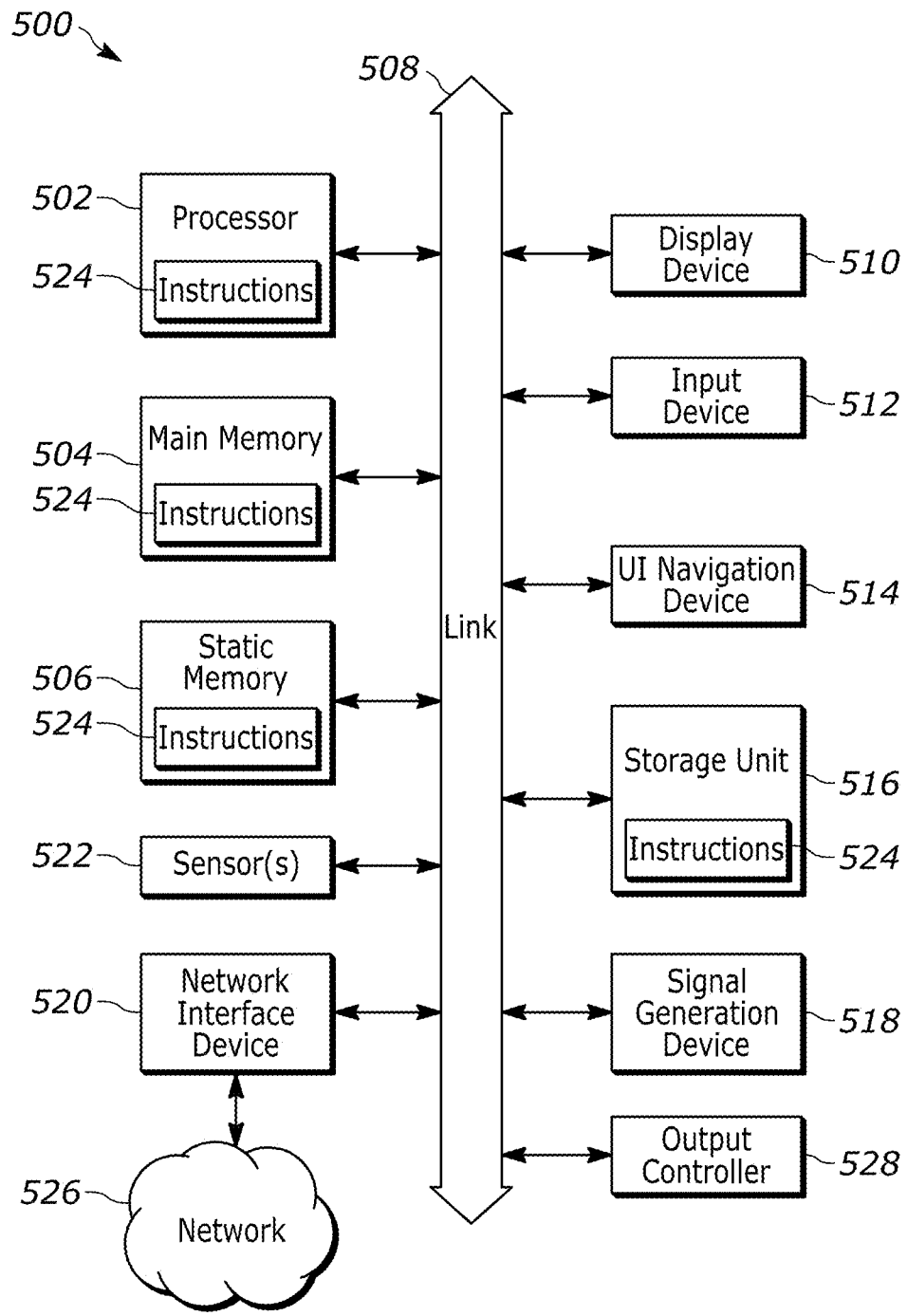
FIG. 5 is a block diagram of an electronic computing system.

Example Machine Architecture and Machine-Readable Medium. FIG. 5 is a block diagram of an electronic computing system suitable for implementing the systems or for executing the methods disclosed herein. The machine of FIG. 5 is shown as a standalone device, which is suitable for implementation of the concepts within this disclosure. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 5 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 500 includes at least one processor 502 (e.g., controller, microcontroller, a central processing unit (CPU), a graphics processing unit (GPU), tensor processing unit (TPU), advanced processing unit (APU), or combinations thereof), one or more memories such as a main memory 504 a static memory 506, or other types of memory, which communicate with each other via link 508. Link 508 may be a bus or other type of connection channel. The machine 500 may include further optional aspects such as a graphics display unit 510 comprising any type of display. The machine 500 may also include other optional aspects such as an alphanumeric input device 512 (e.g., a keyboard, touch screen, and so forth), a user interface (UI) navigation device 514 (e.g., a mouse, trackball, touch device, and so forth), a storage unit 516 (e.g., disk drive or other storage device(s)), a signal generation device 518 (e.g., a speaker), sensor(s) 521 (e.g., global positioning sensor, accelerometer(s), microphone(s), camera(s), and so forth), output controller 528 (e.g., wired or wireless connection to connect and/or communicate with one or more other devices such as a universal serial bus (USB), near field communication (NFC), infrared (IR), serial/parallel bus, etc.), and a network interface device 520 (e.g., wired and/or wireless) to connect to and/or communicate over one or more networks 526.

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

Figure 6:
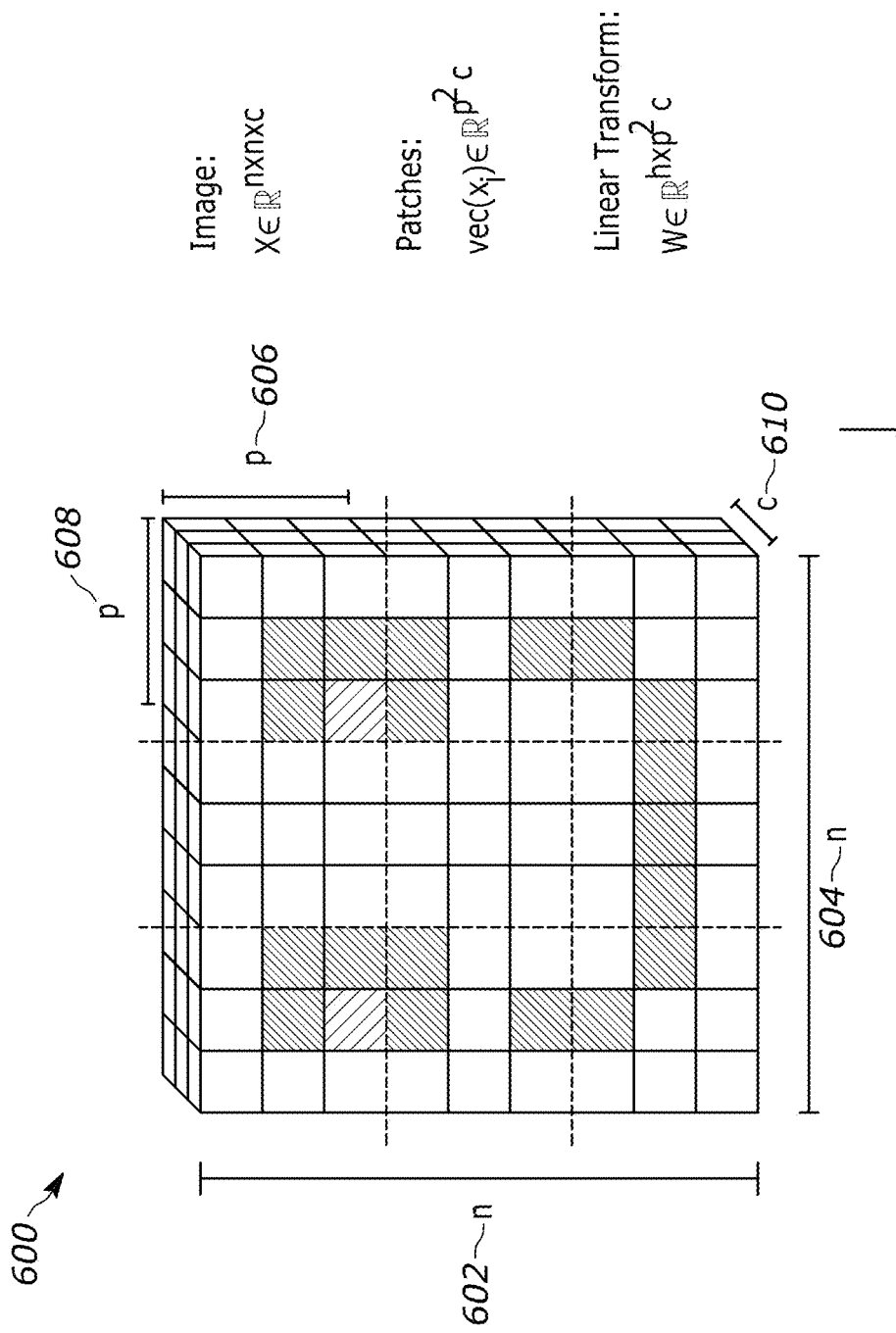
FIG. 6 is a graphical representation of an image, patch size, and channel depth.

FIG. 6 is a graphical representation of an image 600 having a length 602 and width 604 (shown here as n×n), a patch size defined by a patch length 606 and patch width 608 (shown here as p×p), and channel depth 610 (shown here as c). For example, if the image is an RGB (Red Green Blue) based image, then c could be the number of input channels or 3 for RGB. However if the image may have more of less channels based on how it is represented. Consider an image that is generated by an such as sound, IR, RADAR, LIDAR, magnetic imaging, etc. may have greater than 3 channels.

Figure 7:
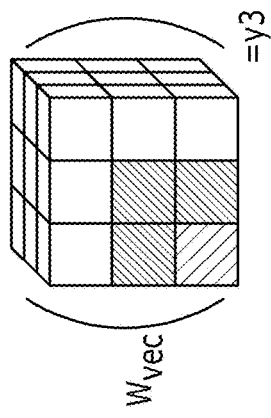
FIG. 7 is a graphical representation of weight vectors for the patch embeddings of the image of FIG. 6.
Figure 7:
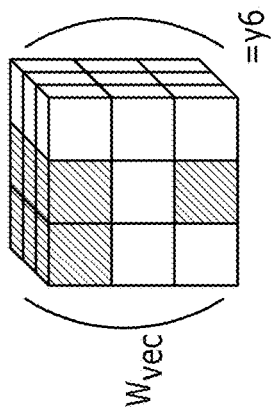
Figure 7:
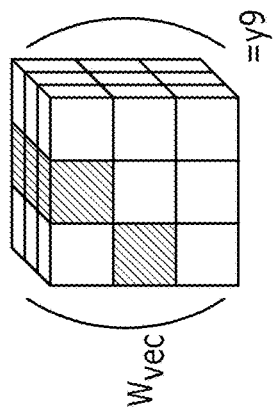
Figure 7:
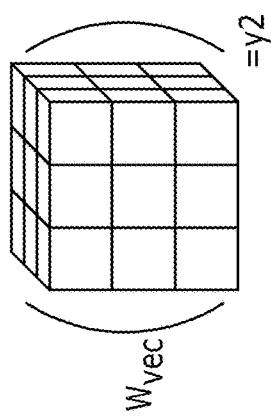
Figure 7:
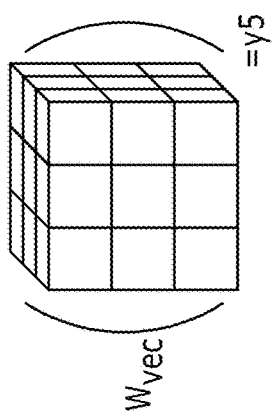
Figure 7:
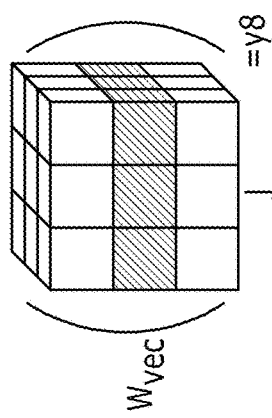
Figure 7:
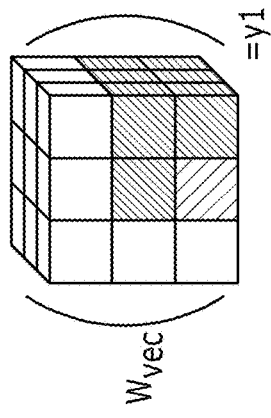
Figure 7:
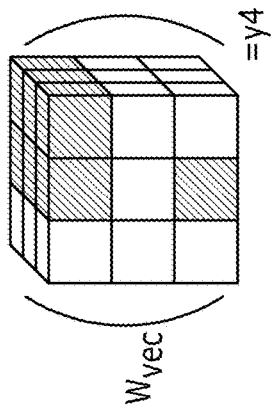
Figure 7:
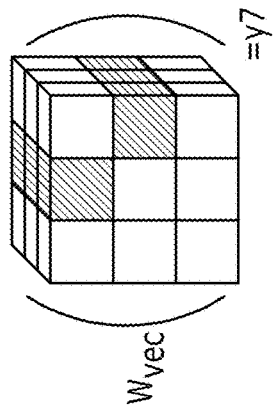

FIG. 7 is a graphical representation of weight vectors for the patch embeddings of the image of FIG. 6. Here h is the number of channels in the feature map that is dependent upon the architecture. As the patch and stride are equal, there is no overlap and $y_1$ would correspond to the upper left patch of the image, $y_2$ would correspond to the upper middle patch of the image, $y_3$ would correspond to the upper right patch of the image, and so forth.

Figure 8:
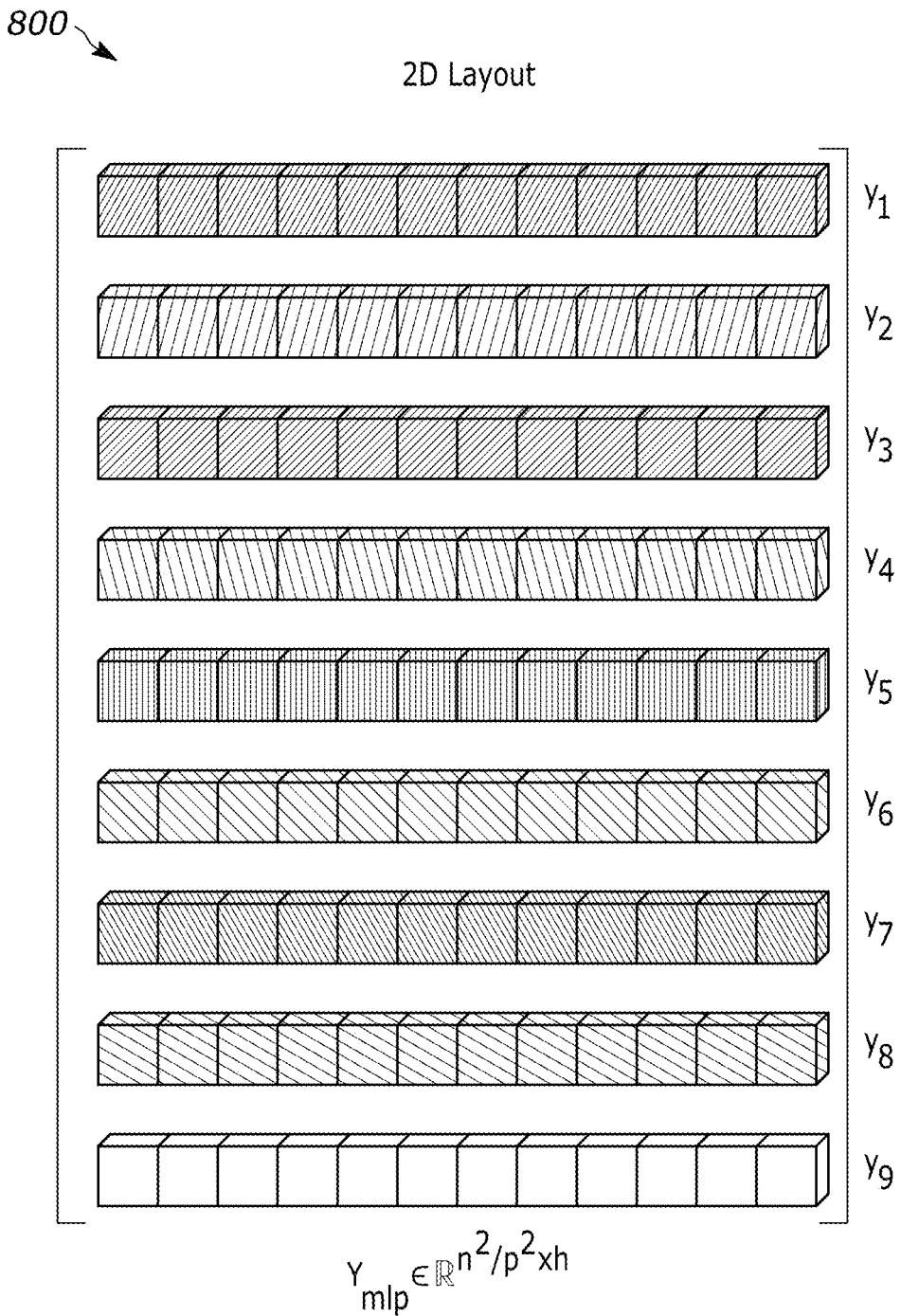
FIG. 8 is a graphical representation of a 2-dimensional layout of channel depth for each patch.

FIG. 8 is a graphical representation of a 2-dimensional layout 800 of channel depth for each patch. An advantage of looking at a 2D layout includes that the point-wise convolution acts on each pixel separately and therefore the spatial relationship is not taken into account thus allowing for dense matrix multiplication that may be more efficient.

Figure 9:
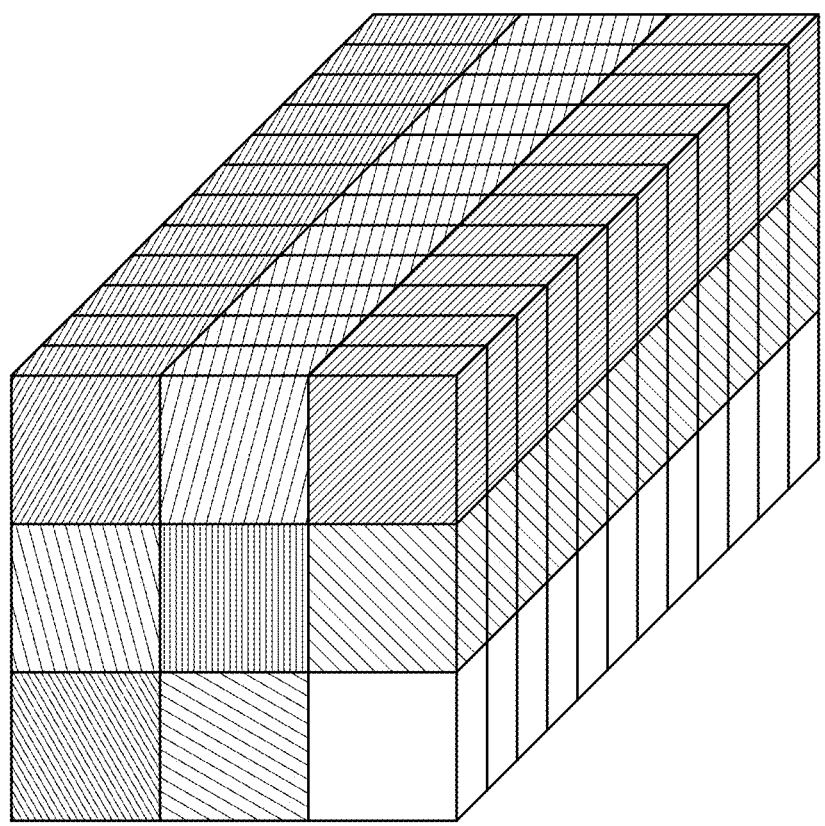
FIG. 9 is a graphical representation of a 3-dimensional layout of each feature map with channel depth.

FIG. 9 is a graphical representation of a 3-dimensional layout 900 of each feature map with channel depth. The 3D layout maintains spatial relationship such that the depth is now represented by h that is the dimension of the patch embeddings or stated another way, h is the number of channels in the feature map.

Figure 10:
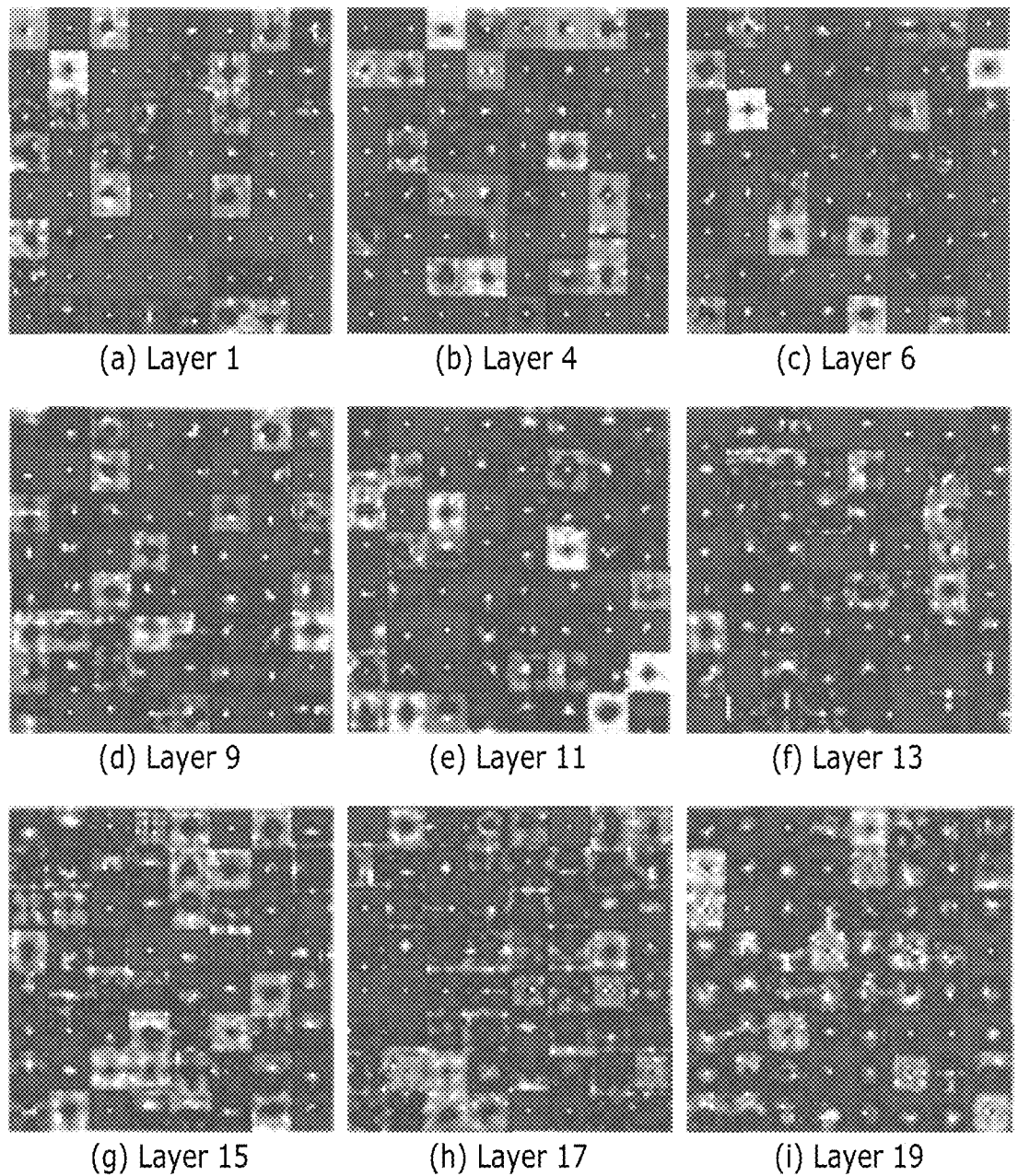
FIG. 10 is a graphical representation of specific subsets of 64 depth-wise convolutional kernels from progressively deeper layers of ConvMixer-1536/20.

FIG. 10 is a graphical representation of specific subsets of 64 depth-wise convolutional kernels from progressively deeper layers of ConvMixer-1536/20. The images correspond to (a) layer 1, (b) layer 4, (c) layer 6, (d) layer 9, (e) layer 11, (f) layer 13, (g) layer 15, (h) layer 17, and (i) layer 19.

Convolutions have been increasingly replaced by self-attention and more general linear transformations, often in networks which forgo the traditional pyramid shaped design. These networks have a more lenient inductive bias and, consequently, often require much more data. These networks tend to increase weight sharing, avoid pooling, and mix information from distant spatial locations. This disclosure presents a simple, yet competitive fully-convolutional architecture that retains the properties sacrificed using the self-attention and more general linear transformations, while increasing data efficiency and trainability. The simple, yet competitive fully-convolutional architecture "ConvMixer" achieves high accuracy on ImageNet-1K and CIFAR-10 with no pre-training, and typically with a fraction of the parameters. For example, we achieve 96.3% accuracy on CIFAR-10 with 672K parameters, and 77.5% top-1 accuracy on ImageNet-1K with 14.6M parameters.

Convolutional neural networks have been the dominant approach to computer vision tasks for many years. But recently, with the onset of vision transformers, the interest has shifted to alternate architectures with a large focus on self-attention that showcase novel operators instead of convolution. These architectures are often simpler than modern convolutional networks: e.g., they tend to exclude down sampling (like striding and pooling), instead comprising identical blocks repeatedly applied to feature maps that are all the same size (or isotropic).

This departure from relatively complex convolutional networks comes hand-in-hand with the introduction of patch embeddings. That is, the first layer is a linear transformation applied identically to non-overlapping square regions of the input (FIG. 6). Then, the model processes the patch embeddings rather than the original image (FIG. 7).

In these new architectures, the spotlight has primarily been on unconventional and often more expressive operators like self-attention or simply multilayer-perceptrons. However, in computer vision tasks, these new operations have been introduced simultaneously with novel network designs. This disclosure illustrates the benefit of disentangling the effect of the operators from that of the architecture. Often self-attention is put inside traditionally-designed neural networks or fused convolution and self-attention. This disclosure presents only traditional operations (i.e., convolution) in isotropic architectures.

This disclosure presents an extremely simple architecture in the spirit of vision transformers using patch embeddings that uses only standard depth-wise and point-wise convolution operations.

Despite its simplicity and its use of theoretically less expressive convolutional layers, this architecture is competitive with now-canonical models like ResNet and DeiT, even when all are trained in the same modern pipeline (i.e., near-default settings in timm).

This highlights the advantages of the new, simple isotropic architecture designs used in many recent works. Moreover, to emphasize that patch embeddings are what enable this network design: Instead of progressively down-sampling, the patch layer immediately converts inputs to a reasonable predetermined size which is maintained throughout the network.

This model, called ConvMixer, consists of patch embeddings followed by repeated applications of a simple fully-convolutional block. Importantly, the use of "3D layout" for patch embeddings with dimension h that is illustrated in FIG. 9, which for patch size p can be implemented as convolution:

$$z_0 = BN(\sigma\{Conv_{c_{in} \to h}(X, stride=p, kernel\_size=p)\}) \quad (1)$$

The block consists of depth-wise convolution followed by point-wise (e.g., 1×1) convolution, each of which is followed by an activation and post-activation BatchNorm:

$$z'_l = BN(\sigma\{ConvDepthwise(z_{l-1})\}) + z_{l-1} \quad (2)$$

$$Z_{l+1} = BN(\sigma\{ConvPointwise(z_l^0)\}) \quad (3)$$

After multiple applications of this block, the system then performs global pooling to get a feature vector of size h, which can then be classified with a linear classifier.

Design parameters. An instantiation of ConvMixer depends on four parameters: (1) the hidden dimension h (i.e., the dimension of the patch embeddings), (2) the depth d, or the number of repetitions of the fully-convolutional block, (3) the patch size p which controls the internal resolution of the model, (4) the kernel size k of the depth-wise convolutional layer. The nomenclature of ConvMixers is based after their hidden dimension and depth, like ConvMixer-h/d. As illustrated later in this disclosure, ConvMixers work best with unusually large kernel sizes and small patch sizes. The (intended) input size n divided by the patch size p is referred to as the internal resolution.

Motivation. This architecture is based on the idea of mixing. For example, consider depth-wise convolution to mix spatial locations and point-wise convolution to mix channel locations. A key idea is that MLPs and self-attention can mix arbitrarily distant spatial locations, i.e., they can have an arbitrarily large receptive field. Consequently, one can hypothesized that large kernels would be crucial to mix distant spatial locations.

Patch embeddings. Simply a convolution with kernel size p, stride of p, and h kernels. h is the patch embedding dimension. In another embodiment, this can be reshaped into a h×(n/p)$^2$ matrix. Thus the spatial data remains intact and work with h×n/p×n/p tensors. Since this model maintains the same internal resolution throughout, which is enabled by patch embeddings, it can be referred to as isotropic.

While self-attention and multilayer perceptron (MLPs) are more flexible, thus allowing for large receptive fields and content-aware behavior, a convolution has several benefits. Its inductive bias, which includes translation invariance, is amenable to vision tasks and leads to high data efficiency. Further, fully-convolutional can be applied to variable-sized inputs, which is useful in practice and allows for training speedups; convolution is very amenable to low-level optimizations.

Below is an implementation of an embodiment of this model in PyTorch, which is capable of 81.4% top-1 accuracy on ImageNet with minimal tuning. The modules Reduce and Residual are in the einops package and shown below.

and it was discovered that excluding one after point-wise convolution (Eq. 3) led to faster convergence. Replacing BatchNorm with LayerNorm reduced accuracy by ≈1%. See Table 1.

TABLE 1

Small ablation study of training a
ConvMixer-256/8 on CIFAR-10
Ablation of ConvMixer-256/8 on CIFAR-10

| Ablation | CIFAR-10 Acc. (%) |
|---|---|
| Baseline | 95.88 |
| BatchNorm → LayerNorm | 94.44 |
| GELU → ReLU | 95.51 |
| Mixup and CutMix | 95.92 |
| Random Erasing | 95.24 |
| RandAug | 92.86 |
| Random Scaling | 86.24 |
| Gradient Norm Clipping | 86.33 |

Results. A ConvMixer-1536/20 with around 50M parameters achieved 81.4% top-1 accuracy on ImageNet, and a ConvMixer-768/32 with 20M parameters achieved around 80.2% (see Table 1). Wider ConvMixers seem to converge in fewer epochs, but are memory- and compute-intensive. ConvMixers with smaller patches performed substantially better. Larger patches require deeper ConvMixers. Although one may expect large kernels to be crucial, However, ConvMixer-1536/20 received 81.37% accuracy with k=9 and 80.4% with k=3, which is a smaller effect than expected. In terms of parameters, setting k=9 is a worthy tradeoff, but throughput and training time are around twice as fast for k=3.

Table 2 illustrates that ConvMixers achieve competitive accuracies for a given parameter budget: DeiT-B gets 81.8% accuracy for 86M params, while ConvMixer-1536/20 gets 81.37% accuracy for 52M params. The same ConvMixer also outperforms ResNet-152, trained in the same way, which has 79.64% accuracy and 60M params. However, a comparable ConvMixer is 4× slower than a ResNet, and up to 7× slower than a DeiT. Future optimizations may change this. This is primarily because the ConvMixer used p=7,

```
1  def ConvMixer(dim, depth, kernel_size=9, patch_size=7, n_classes=1000):
2      return nn.Sequential(
3          nn.Conv2d(3, dim, kernel_size=patch_size, stride=patch_size),
4          nn.GELU( ), nn.BatchNorm2d(dim),
5          *[nn.Sequential(
6              Residual(nn.Sequential(
7                  nn.Conv2d(dim, dim, kernel_size, groups=dim, padding="same"),
8                  nn.GELU( ), nn.BatchNorm2d(dim))),
9              nn.Conv2d(dim, dim, kernel_size=1),
10             nn.GELU( ), nn.BatchNorm2d(dim)
11         ) for i in range(depth)],
12         Reduce("b c h w -> b c", "mean"),
13         nn.Linear(dim, n_classes))
```

This is an exemplary PyTorch implementation of ConvMixer, where h=dim, d=depth, p=patch_size, k=kernel_size.

In one embodiment, a small-scale experiment on CIFAR-10 was performed in which ConvMixers achieve over 96% accuracy with as little as 0.7M parameters. This demonstrated the data efficiency of convolutional inductive bias. Several configurations for residual connections where used while the DeiT used p=16, which limits our comparison. For a closer comparison, ConvMixer-512/16 with p=16, and 5.8M parameters gets 72.6% accuracy, while DeiT-Ti with 5M parameters gets 72.2% accuracy; the ConvMixer is ≈2.5× slower. For similar patch size and parameters, ConvMixer-768/32 is somewhat more accurate than ResMLP-S12/8, but has 0.3× the throughput.

TABLE 2

All throughputs measured on an RTX8000 GPU using batch size 64.
Comparison with other simple models trained on ImageNet-1k only with input size 224.

| Network | Patch Size | # Params ($\times 10^8$) | Throughput (img/sec) | # Epochs | Batch Size | ImNet top-1 (%) |
|---|---|---|---|---|---|---|
| ConvMixer-1536/20 | 7 | 51.6 | 89 | 150 | — | 81.37 |
| ConvMixer-768/32 | 7 | 21.1 | 203 | 300 | — | 80.16 |
| ConvMixer-1024/16 | 7 | 19.4 | 173 | 110 | — | 79.45 |
| ConvMixer-1024/20 | 14 | 24.4 | 520 | 150 | — | 76.94 |
| ConvMixer-512/16 | 16 | 5.8 | 1129 | 90 | — | 72.60 |
| ResNet-152 | — | 60.19 | 872 | 150 | — | 79.64 |
| ResNet-101 | — | 44.55 | 1040 | 150 | — | 78.33 |
| ResNet-50 | — | 25.56 | 1942 | 150 | — | — |
| DeiT-Ti | 16 | 5 | 2727 | 300 | — | 72.2 |
| DeiT-S | 16 | 22 | 1491 | 300 | — | 79.8 |
| DeiT-B | 16 | 86 | 703 | 300 | — | 81.8 |
| ResMLP-B24 | 16 | 116 | 1191 | 400 | — | 81.0 |
| ResMLP-S12/8 | 8 | 22.1 | 638 | 400 | — | 79.1 |
| ResMLP-B24/8 | 8 | 129.1 | 140 | 400 | — | 81.0 |
| ViT-B/16 | 16 | 86 | 704 | 300 | 4096 | 77.9 |
| Mixer-B/16 | 16 | 59 | 816 | 300 | 4096 | 76.44 |
| MobileNetv 3 large/1.0 | | 5.4 | 3466 | | | 75.2 |
| MobileNetv 3 small/1.0 | | 2.5 | 4156 | | | 67.5 |
| Isotropic MobileNetv3 | 8 | 20 | | | | 80.6 |
| Isotropic MobileNetv3 | 16 | 20 | | | | 77.6 |

Isotropic architectures. Vision transformers have inspired a new paradigm of isotropic architectures which use patch embeddings for the first layer. These models look similar to repeated transformer-encoder blocks with different operations replacing the self-attention and MLP operations. For example, MLP-Mixer replaces them both with MLPs applied across different dimensions (i.e., spatial and channel location mixing); ResMLP is a data-efficient variation on this theme. CycleMLP, gMLP, and vision permutator, replace one or both blocks with various novel operations. These are all quite performant, which is typically attributed to the novel choice of operations. A study predating vision transformers investigates isotropic (or "isometric") Mobile-Nets, and even implements patch embeddings under another name. Their architecture simply repeats an isotropic Mobile-Netv3 block. They identify a tradeoff between patch size and accuracy that matches our experience, and train similarly performant models (see Appendix 2). However, their block is substantially more complex than ours; simplicity and motivation sets our work apart. We emphasize what these works have in common: patch embeddings enabling a simple architecture.

Vision transformer performance can be increased by replacing standard patch embeddings with a different stem, for example a standard convolutional stem, or by repeatedly combining nearby patch embeddings. However, this may be simply adding convolution-like inductive biases, i.e., locality, to vision transformers via more complex stems. In other words, the works entangle removing patch embeddings and increasing the locality of tokens, which can be done through other means such as using 3D layout patch embeddings with locality-preserving operations like convolution.

The architecture presented above may be used in multiple embodiments in which image data or modalities of image data is used. FIGS. 11-16 illustrate exemplary embodiments however the concepts of this disclosure may be applied to additional embodiments. Some exemplary embodiments include: Industrial applications in which the modalities may include video, weight, IR, 3D camera, and sound; power tool or appliance applications in which the modalities may include torque, pressure, temperature, distance, or sound; medical applications in which the modalities may include ultrasound, video, CAT scan, MM, or sound; robotic applications in which the modalities may include video, ultrasound, LIDAR, IR, or Sound; and security applications in which the modalities may include video, sound, IR, or LIDAR. The modalities may have diverse datasets for example, a video dataset may include an image, a LIDAR dataset may include a point cloud, and an microphone dataset may include a time series.

Figure 11:
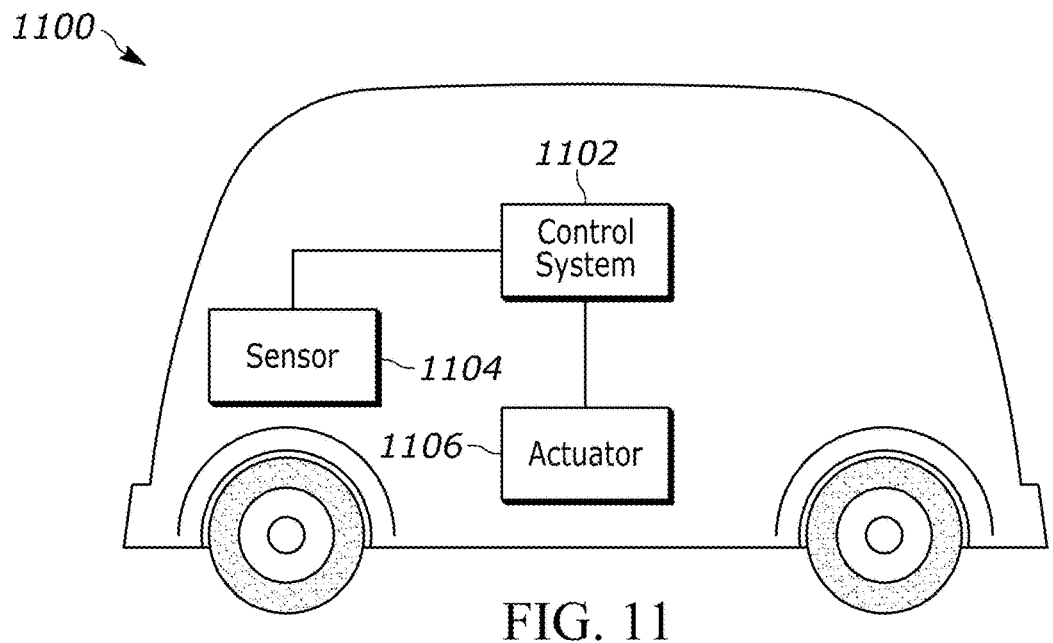
FIG. 11 is a schematic diagram of a control system configured to control a vehicle.

FIG. 11 is a schematic diagram of control system 1102 configured to control a vehicle, which may be an at least partially autonomous vehicle or an at least partially autonomous robot. The vehicle includes a sensor 1104 and an actuator 1106. The sensor 1104 may include one or more wave energy based sensor (e.g., a Charge Coupled Device CCD, or video), radar, LiDAR, microphone array, ultrasonic, infrared, thermal imaging, acoustic imaging or other technologies (e.g., positioning sensors such as GPS). One or more of the one or more specific sensors may be integrated into the vehicle. Alternatively or in addition to one or more specific sensors identified above, the control module 1102 may include a software module configured to, upon execution, determine a state of actuator 1104.

In embodiments in which the vehicle is an at least a partially autonomous vehicle, actuator 1106 may be embodied in a brake system, a propulsion system, an engine, a drivetrain, or a steering system of the vehicle. Actuator control commands may be determined such that actuator 1106 is controlled such that the vehicle avoids collisions with detected objects. Detected objects may also be classified according to what the classifier deems them most likely to be, such as pedestrians or trees. The actuator control commands may be determined depending on the classification. For example, control system 1102 may segment an image (e.g., optical, acoustic, thermal) or other input from sensor 1104 into one or more background classes and one or more object classes (e.g. pedestrians, bicycles, vehicles, trees, traffic signs, traffic lights, road debris, or construction barrels/cones, etc.), and send control commands to actuator 1106, in this case embodied in a brake system or propulsion system, to avoid collision with objects. In another example, control system 1102 may segment an image into one or more background classes and one or more marker classes (e.g., lane markings, guard rails, edge of a roadway, vehicle tracks, etc.), and send control commands to actuator 1106, here embodied in a steering system, to cause the vehicle to avoid crossing markers and remain in a lane. In a scenario where an adversarial attack may occur, the system described above may be further trained to better detect objects or identify a change in lighting conditions or an angle for a sensor or camera on the vehicle.

In other embodiments where vehicle 1100 is an at least partially autonomous robot, vehicle 1100 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 1106 may be determined such that a propulsion unit, steering unit and/or brake unit of the mobile robot may be controlled such that the mobile robot may avoid collisions with identified objects.

In another embodiment, vehicle 1100 is an at least partially autonomous robot in the form of a gardening robot. In such embodiment, vehicle 1100 may use an optical sensor as sensor 1104 to determine a state of plants in an environment proximate vehicle 1100. Actuator 1106 may be a nozzle configured to spray chemicals. Depending on an identified species and/or an identified state of the plants, actuator control command 1102 may be determined to cause actuator 1106 to spray the plants with a suitable quantity of suitable chemicals.

Vehicle 1100 may be an at least partially autonomous robot in the form of a domestic appliance. Non-limiting examples of domestic appliances include a washing machine, a stove, an oven, a microwave, or a dishwasher. In such a vehicle 1100, sensor 1104 may be an optical or acoustic sensor configured to detect a state of an object which is to undergo processing by the household appliance. For example, in the case of the domestic appliance being a washing machine, sensor 1104 may detect a state of the laundry inside the washing machine. Actuator control command may be determined based on the detected state of the laundry.

In this embodiment, the control system 1102 would receive image (optical or acoustic) and annotation information from sensor 1104. Using these and a prescribed number of classes k and similarity measure $\overline{K}$ that are stored in the system, the control system 1102 may use the method described in FIG. 10 to classify each pixel of the image received from sensor 1104. Based on this classification, signals may be sent to actuator 1106, for example, to brake or turn to avoid collisions with pedestrians or trees, to steer to remain between detected lane markings, or any of the actions performed by the actuator 1106 as described above. Signals may also be sent to sensor 1104 based on this classification, for example, to focus or move a camera lens.

Figure 12:
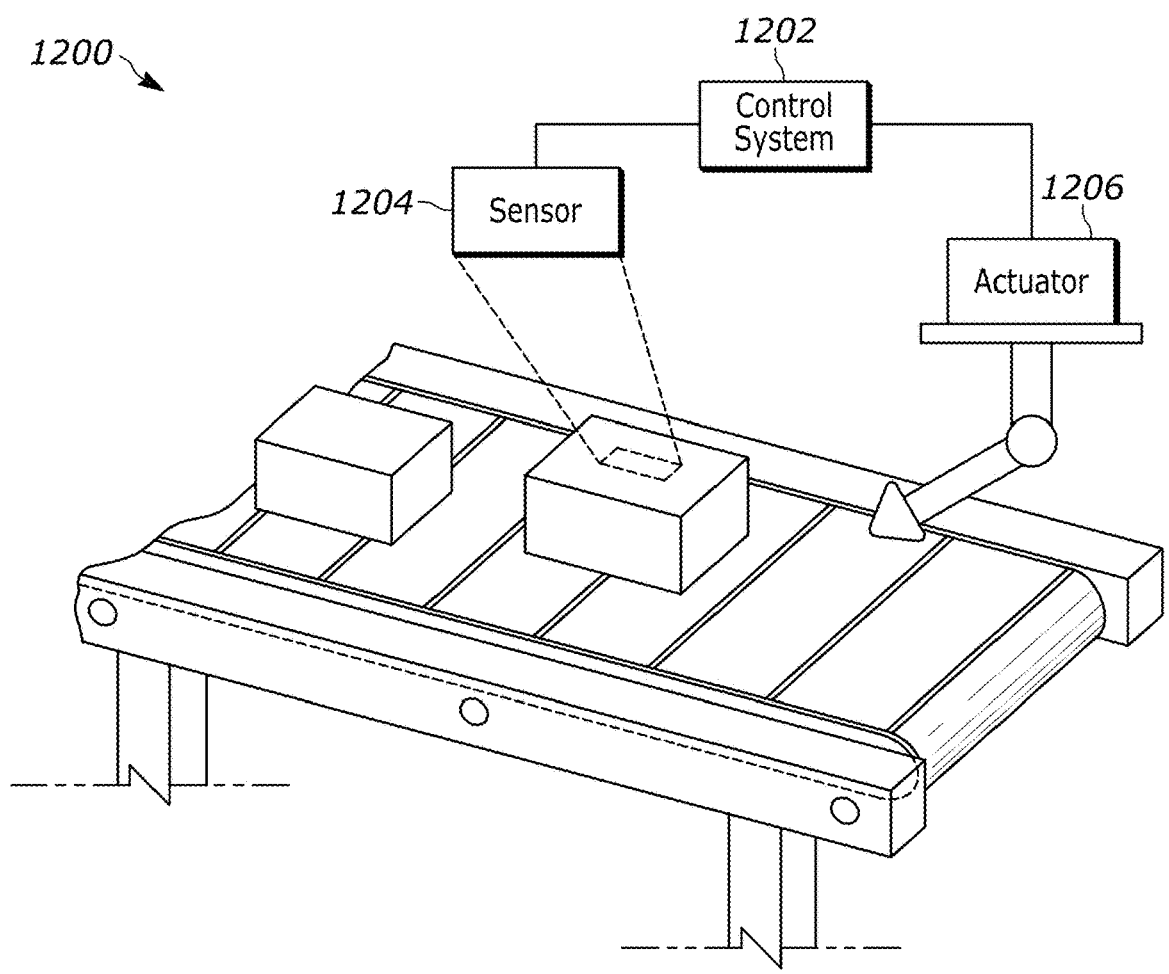
FIG. 12 is a schematic diagram of a control system configured to control a manufacturing machine.

FIG. 12 depicts a schematic diagram of control system 1202 configured to control system 1200 (e.g., manufacturing machine), such as a punch cutter, a cutter or a gun drill, of manufacturing system 102, such as part of a production line. Control system 1202 may be configured to control actuator 14, which is configured to control system 100 (e.g., manufacturing machine).

Sensor 1204 of system 1200 (e.g., manufacturing machine) may be an wave energy sensor such as an optical or acoustic sensor or sensor array configured to capture one or more properties of a manufactured product. Control system 1202 may be configured to determine a state of a manufactured product from one or more of the captured properties. Actuator 1206 may be configured to control system 1202 (e.g., manufacturing machine) depending on the determined state of manufactured product 104 for a subsequent manufacturing step of the manufactured product. The actuator 1206 may be configured to control functions of FIG. 11 (e.g., manufacturing machine) on subsequent manufactured products of the system (e.g., manufacturing machine) depending on the determined state of the previous manufactured product.

In this embodiment, the control system 1202 would receive image (e.g., optical or acoustic) and annotation information from sensor 1204. Using these and a prescribed number of classes k and similarity measure K that are stored in the system, the control system 1202 may use the method described in FIG. 10 to classify each pixel of the image received from sensor 1204, for example, to segment an image of a manufactured object into two or more classes, to detect anomalies in the manufactured product, to ensure the presence of objects on the manufactured product such as barcodes. Based on this classification, signals may be sent to actuator 1206. For example, if control system 1202 detects anomalies in a product, actuator 1206 may mark or remove anomalous or defective products from the line. In another example, if control system 1202 detects the presence of barcodes or other objects to be placed on the product, actuator 1106 may apply these objects or remove them. Signals may also be sent to sensor 1204 based on this classification, for example, to focus or move a camera lens.

Figure 13:
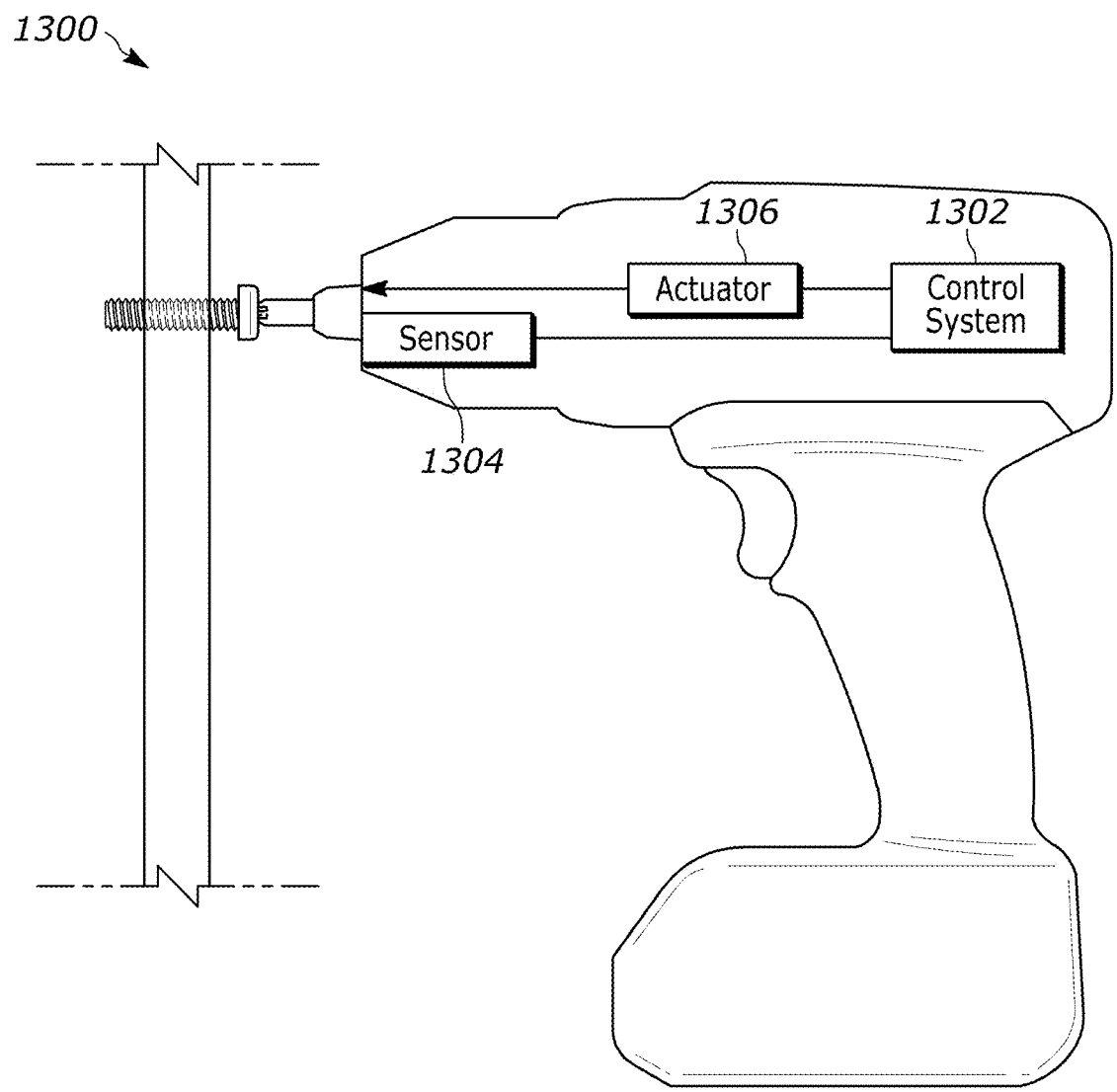
FIG. 13 is a schematic diagram of a control system configured to control a power tool.

FIG. 13 depicts a schematic diagram of control system 1302 configured to control power tool 1300, such as a power drill or driver, that has an at least partially autonomous mode. Control system 1302 may be configured to control actuator 1306, which is configured to control power tool 1300.

Sensor 1304 of power tool 1300 may be a wave energy sensor such as an optical or acoustic sensor configured to capture one or more properties of a work surface and/or fastener being driven into the work surface. Control system 1302 may be configured to determine a state of work surface and/or fastener relative to the work surface from one or more of the captured properties.

In this embodiment, the control system 1302 would receive image (e.g., optical or acoustic) and annotation information from sensor 1304. Using these and a prescribed number of classes k and similarity measure K that are stored in the system, the control system 1302 may use the method described in FIG. 10 to classify each pixel of the image received from sensor 1304 in order to segment an image of a work surface or fastener into two or more classes or to detect anomalies in the work surface or fastener. Based on this classification, signals may be sent to actuator 1306, for example to the pressure or speed of the tool, or any of the actions performed by the actuator 1306 as described in the above sections. Signals may also be sent to sensor 1304 based on this classification, for example, to focus or move a camera lens. In another example, the image may be a time series image of signals from the power tool 1300 such as pressure, torque, revolutions per minute, temperature, current, etc. in which the power tool is a hammer drill, drill, hammer (rotary or demolition), impact driver, reciprocating saw, oscillating multi-tool, and the power tool is either cordless or corded.

Figure 14:
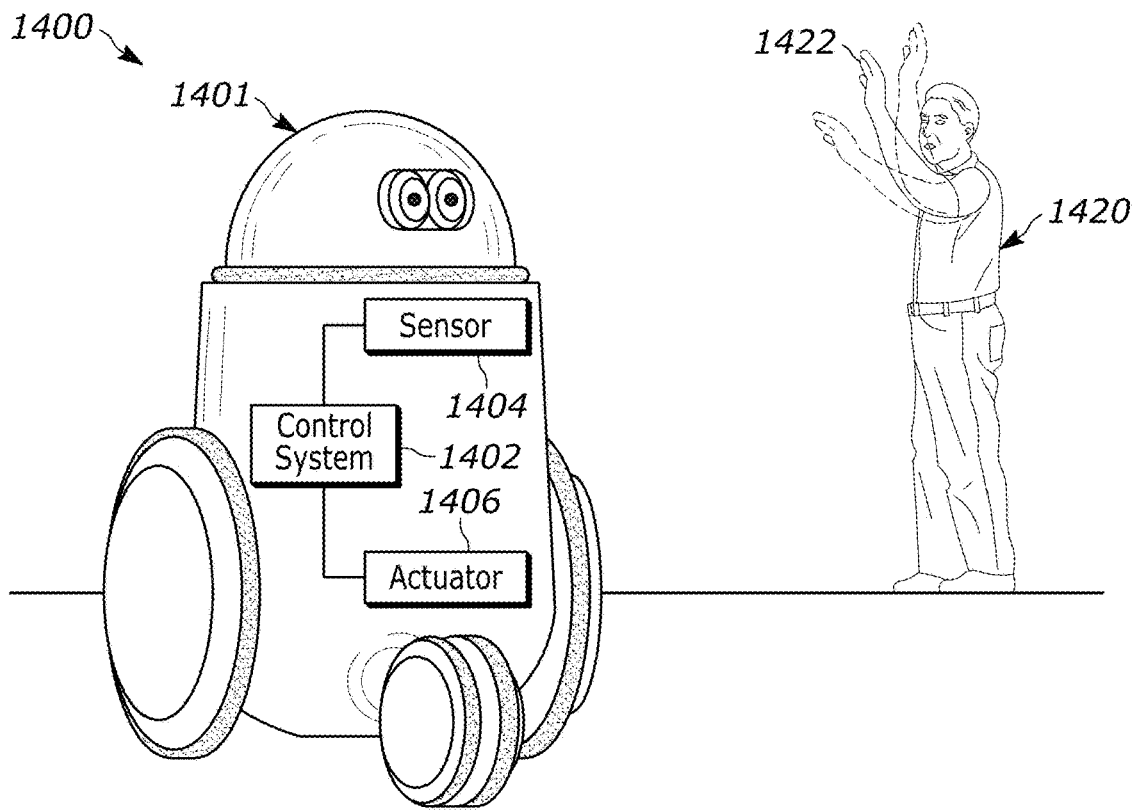
FIG. 14 is a schematic diagram of a control system configured to control an automated personal assistant.

FIG. 14 depicts a schematic diagram of control system 1402 configured to control automated personal assistant 1401. Control system 1402 may be configured to control actuator 1406, which is configured to control automated personal assistant 1401. Automated personal assistant 1401 may be configured to control a domestic appliance, such as a washing machine, a stove, an oven, a microwave or a dishwasher.

In this embodiment, the control system 1402 would receive image (e.g., optical or acoustic) and annotation information from sensor 1404. Using these and a prescribed number of classes k and similarity measure $\overline{K}$ that are stored in the system, the control system 1402 may use the method described in FIG. 10 to classify each pixel of the image received from sensor 1404, for example, to segment an image of an appliance or other object to manipulate or operate. Based on this classification, signals may be sent to actuator 1406, for example, to control moving parts of automated personal assistant 1401 to interact with domestic appliances, or any of the actions performed by the actuator 1406 as described in the above sections. Signals may also be sent to sensor 1404 based on this classification, for example, to focus or move a camera lens.

Figure 15:
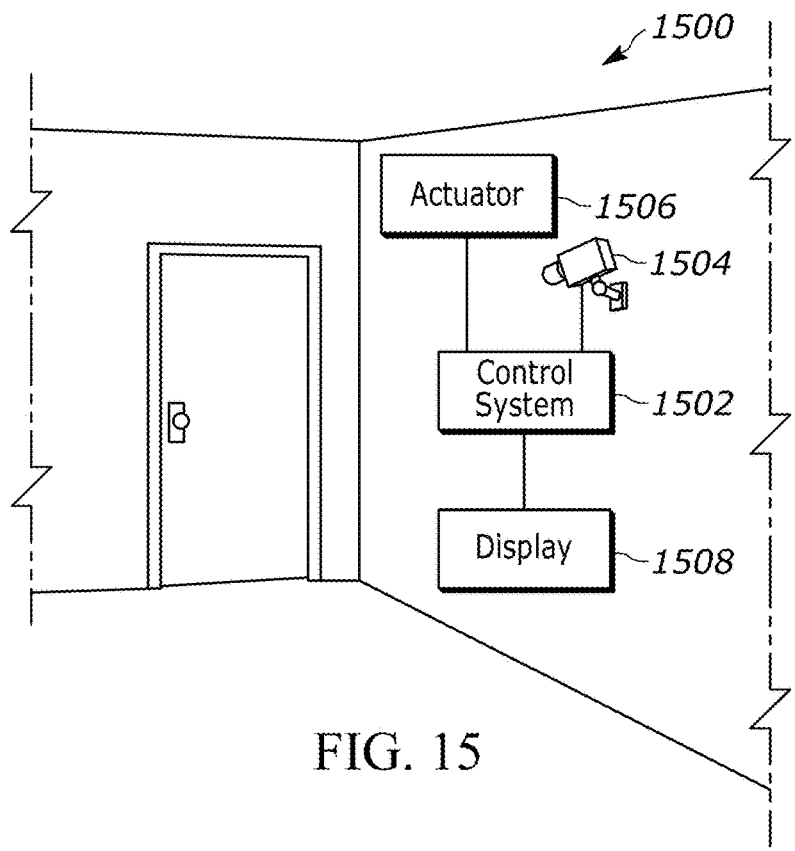
FIG. 15 is a schematic diagram of a control system configured to control a monitoring system.

FIG. 15 depicts a schematic diagram of control system 1502 configured to control monitoring system 1500. Monitoring system 1500 may be configured to physically control access through door 252. Sensor 1504 may be configured to detect a scene that is relevant in deciding whether access is granted. Sensor 1504 may be an optical or acoustic sensor or sensor array configured to generate and transmit image and/or video data. Such data may be used by control system 1502 to detect a person's face.

Monitoring system 1500 may also be a surveillance system. In such an embodiment, sensor 1504 may be a wave energy sensor such as an optical sensor, infrared sensor, acoustic sensor configured to detect a scene that is under surveillance and control system 1502 is configured to control display 1508. Control system 1502 is configured to determine a classification of a scene, e.g. whether the scene detected by sensor 1504 is suspicious. A perturbation object may be utilized for detecting certain types of objects to allow the system to identify such objects in non-optimal conditions (e.g., night, fog, rainy, interfering background noise etc.). Control system 1502 is configured to transmit an actuator control command to display 1508 in response to the classification. Display 1508 may be configured to adjust the displayed content in response to the actuator control command. For instance, display 1508 may highlight an object that is deemed suspicious by controller 1502.

In this embodiment, the control system 1502 would receive image (optical or acoustic) and annotation information from sensor 1504. Using these and a prescribed number of classes k and similarity measure $\overline{K}$ that are stored in the system, the control system 1502 may use the method described in FIG. 10 to classify each pixel of the image received from sensor 1504 in order to, for example, detect the presence of suspicious or undesirable objects in the scene, to detect types of lighting or viewing conditions, or to detect movement. Based on this classification, signals may be sent to actuator 1506, for example, to lock or unlock doors or other entryways, to activate an alarm or other signal, or any of the actions performed by the actuator 1506 as described in the above sections. Signals may also be sent to sensor 1504 based on this classification, for example, to focus or move a camera lens.

Figure 16:
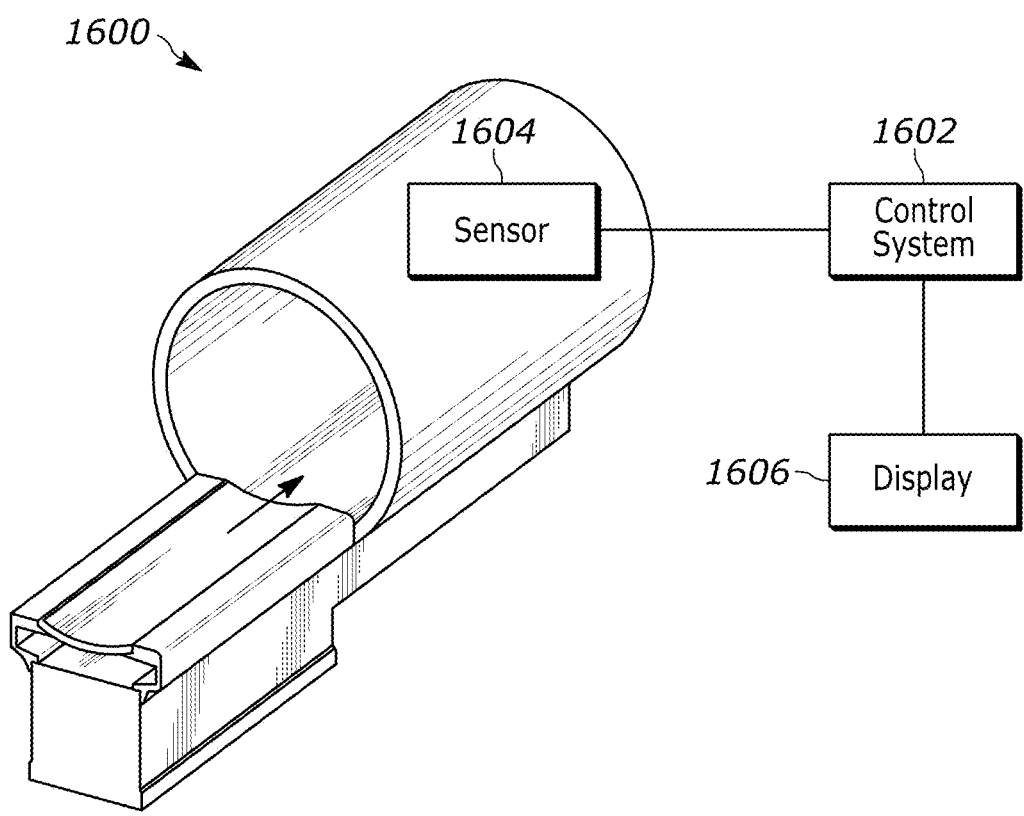
FIG. 16 is a schematic diagram of a control system configured to control a medical imaging system.

FIG. 16 depicts a schematic diagram of control system 1602 configured to control imaging system 1600, for example an MRI apparatus, x-ray imaging apparatus or ultrasonic apparatus. Sensor 1604 may, for example, be an imaging sensor or acoustic sensor array. Control system 1602 may be configured to determine a classification of all or part of the sensed image. Control system 1602 may be configured to determine or select an actuator control command in response to the classification obtained by the trained neural network. For example, control system 1602 may interpret a region of a sensed image (optical or acoustic) to be potentially anomalous. In this case, the actuator control command may be determined or selected to cause display 1606 to display the imaging and highlighting the potentially anomalous region.

In this embodiment, the control system 1602 would receive image and annotation information from sensor 1604. Using these and a prescribed number of classes k and similarity measure $\overline{K}$ that are stored in the system, the control system 1602 may use the method described in FIG. 10 to classify each pixel of the image received from sensor 1604. Based on this classification, signals may be sent to actuator 1606, for example, to detect anomalous regions of the image or any of the actions performed by the actuator 1606 as described in the above sections.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A computer-implemented method for processing an image utilizing a convolutional neural network, the computer-implemented method comprising:
   receiving an image;
   dividing the image into patches, each patch of size p;
   extracting, via a first convolutional layer, a feature map having a number of channels based on a feature detector of size p, wherein the feature detector has a stride equal to size p;
   refining the feature map by alternatingly applying depth-wise convolutional layers and point-wise convolutional layers to obtain a refined feature map, wherein the number of channels in the feature map, and the size of the feature map remains constant throughout all operations in the refinement; and
   outputting the refined feature map.

2. The method of claim 1, wherein the method includes receiving the image from a sensor.

3. The method of claim 2, wherein the sensor is one of video, RADAR, LIDAR, or ultrasound, and is in communication with a controller is configured to control an autonomous vehicle based on the refined feature map.

4. The method of claim 2, wherein the sensor is one of video, sound, IR, or LIDAR, and is in communication with a controller configured to control an access door based on the refined feature map.

5. The method of claim 2, wherein the sensor is one of video, sound, ultrasound, IR, or LIDAR, and is in communication with a controller configured to control a mechanical system based on the refined feature map.

6. The method of claim 1, wherein the first convolutional layer includes an activation function that is a Gaussian Error Linear Unit (GELU).

7. The method of claim 1 further comprising, averaging the feature map over spatial locations for each channel to obtain a mean for all channels;
   transforming the mean for all channels to obtain a probability that the input image corresponds to a specific class; and
   outputting the probability that the image belongs to the specific class.

8. A computer-implemented method for processing an image utilizing a convolutional neural network, the computer-implemented method comprising:
   receiving an image of size L×W;
   dividing the image into patches, wherein a combined size of each patch equals L×W;
   extracting, via a first convolutional layer, a feature map having a number of channels based on a feature detector of size equal to the patch size, wherein the feature detector has a stride equal to the patch size;
   refining the feature map by alternatingly applying depth-wise convolutional layers and point-wise convolutional layers to obtain a refined feature map, wherein the number of channels in the feature map and the size of the feature map remains constant throughout all operations in the refinement; and
   outputting the refined feature map.

9. The method of claim 8, wherein each patch size is p×p.

10. The method of claim 8, wherein the method includes receiving the image from a sensor.

11. The method of claim 10, wherein the sensor is one of video, RADAR, LIDAR, or ultrasound, and in communication with a controller configured to control an autonomous vehicle based on the refined feature map.

12. The method of claim 10, wherein the sensor is one of video, sound, IR, or LIDAR, and in communication with a controller configured to control an access door based on the refined feature map.

13. The method of claim 10, wherein the first sensor is one of video, sound, ultrasound, IR, or LIDAR, and in communication with a controller configured to control a mechanical system based on the refined feature map.

14. The method of claim 8 further comprising, averaging the feature map over spatial locations for each channel to obtain a mean for all channels;
   transforming the mean for all channels to obtain a probability that the input image corresponds to a specific class; and
   outputting the probability that the image belongs to the specific class.

15. A convolutional neural network system comprising:
   a sensor; and
   a controller, wherein the controller is configured to
   receive an image from the sensor,
   divide the image into patches, each patch of size p,
   extract, via a first convolutional layer, a feature map having a number of channels based on a feature detector of size p, wherein the feature detector has a stride equal to size p,
   refine the feature map by alternatingly applying depth-wise convolutional layers and point-wise convolutional layers to obtain a refined feature map, wherein the number of channels in the feature map and the size of the feature map remains constant throughout all operations in the refinement; and
   output the refined feature map.

16. The convolutional neural network system of claim 15, wherein the sensor is one of video, RADAR, LIDAR, or ultrasound, and the controller is further configured to control an autonomous vehicle based on the refined feature map.

17. The convolutional neural network system of claim 15, wherein the sensor is one of video, sound, IR, or LIDAR, and the controller is further configured to control an access door based on the refined feature map.

18. The convolutional neural network system of claim 15, wherein the sensor is one of video, sound, ultrasound, IR, or LIDAR, and the controller is further configured to control a mechanical system based on the refined feature map.

19. The convolutional neural network system of claim 15 wherein the controller is further configured to, average the feature map over spatial locations for each channel to obtain a mean for all channels;
   transform the mean for all channels to obtain a probability that the input image corresponds to a specific class; and
   output the probability that the image belongs to the specific class.

* * * * *